(12) United States Patent
Ely

(10) Patent No.: US 6,856,495 B2
(45) Date of Patent: Feb. 15, 2005

(54) SERIES PASS OVER-VOLTAGE PROTECTION CIRCUIT HAVING LOW QUIESCENT CURRENT DRAW

(75) Inventor: Jeffrey A. Ely, Kokomo, MI (US)

(73) Assignee: Delphi Technologies, Inc., Troy, MI (US)

( * ) Notice: Subject to any disclaimer, the term of this patent is extended or adjusted under 35 U.S.C. 154(b) by 255 days.

(21) Appl. No.: 10/159,995

(22) Filed: May 31, 2002

(65) Prior Publication Data

US 2003/0223169 A1 Dec. 4, 2003

(51) Int. Cl.[7] .................................................. H02H 3/20
(52) U.S. Cl. ........................................ 361/18; 361/91.1
(58) Field of Search ............................... 361/18, 20–21, 361/23, 30–31, 55–58, 91.1–91.2, 111; 307/10.1, 10.2

(56) References Cited

U.S. PATENT DOCUMENTS

| | | | | |
|---|---|---|---|---|
| 4,319,179 A | * | 3/1982 | Jett, Jr. | ........................ 323/281 |
| 4,495,536 A | * | 1/1985 | Bynum | ......................... 361/58 |
| 4,884,161 A | * | 11/1989 | Atherton et al. | .............. 361/18 |
| 5,333,105 A | * | 7/1994 | Fortune | .................... 363/56.11 |
| 5,929,615 A | * | 7/1999 | D'Angelo et al. | .......... 323/224 |
| 5,959,345 A | | 9/1999 | Fruth et al. | |
| 5,994,188 A | | 11/1999 | Disney | |
| 6,046,577 A | * | 4/2000 | Rincon-Mora et al. | ..... 323/282 |
| 6,127,701 A | | 10/2000 | Disney | |
| 6,188,211 B1 | * | 2/2001 | Rincon-Mora et al. | ..... 323/280 |
| 6,606,227 B2 | | 8/2003 | Rapinski et al. | |
| 6,670,724 B2 | * | 12/2003 | Ely et al. | ................... 307/10.1 |

* cited by examiner

*Primary Examiner*—Brian Sircus
*Assistant Examiner*—Danny Nguyen
(74) *Attorney, Agent, or Firm*—Jimmy L. Funke; Stefan V. Chmielewski

(57) ABSTRACT

An improved series-pass over-voltage protection circuit includes a P-channel enhancement mode MOSFET (PFET) continuously coupling a DC voltage supply such as a motor vehicle storage battery to one or more electrical loads. The source of the PFET is connected to the positive terminal of the DC voltage supply, and in normal operation, low quiescent current draw is achieved by coupling the gate of the PFET to the negative terminal of the power supply through a low-current current sink. A gate discharge amplifier including a high current capability transistor connected across the source-to-gate circuit of the PFET is activated by a controlled current sink when an over-voltage occurs at the drain of the PFET, and the inherent high impedance of the current sinks relative to the gate discharge amplifier provides high immunity of the PFET to input voltage transients. The result is a practical and highly effective over-voltage protection circuit for continuously powered electrical loads.

4 Claims, 2 Drawing Sheets

US 6,856,495 B2

SERIES PASS OVER-VOLTAGE PROTECTION CIRCUIT HAVING LOW QUIESCENT CURRENT DRAW

TECHNICAL FIELD

This invention relates to an over-voltage protection circuit, and more particularly to a series-pass circuit for protecting a continuously powered electrical load from damage due to over-voltage.

BACKGROUND OF THE INVENTION

In a motor vehicle electrical system, over-voltage protection circuitry is needed to protect electrical loads from damage due to over-voltages that can occur during jump-starting and load-dump conditions. Also, the protection circuitry must be active at all times since certain electrical loads (an engine control module, for example) are designed to be powered even during periods of vehicle inactivity. Although passive shunt suppression devices such as Zener diodes or MOVs can be used in certain applications, the transient over-voltage energy can be too high to clamp with shunt devices, particularly in heavy duty vehicle applications. In such applications, a series-pass suppression device such as a linear transistor may be more suitable than a shunt device. However, series-pass suppression circuits typically draw relatively high quiescent current and exhibit slow response to transient voltages. The high quiescent current draw makes the typical series-pass suppression circuit impractical for powering loads during periods of vehicle inactivity, and the slow response to transient voltages can result in transient over-voltage "shoot-through" prior to controlled suppression. Accordingly, what is needed is a series-pass over-voltage suppression circuit that has low quiescent current draw, and that exhibits a fast response to transient over-voltages for minimizing transient over-voltage shoot-through.

SUMMARY OF THE PRESENT INVENTION

The present invention is directed to an improved series-pass over-voltage protection circuit including a P-channel enhancement mode MOSFET (PFET) continuously coupling a DC voltage supply such as a motor vehicle storage battery to one or more electrical loads. The source of the PFET is connected to the positive terminal of the DC voltage supply, and in normal operation, low quiescent current draw is achieved by coupling the gate of the PFET to the negative terminal of the power supply through a low-current current sink. A gate discharge amplifier including a high current capability transistor connected across the source-to-gate circuit of the PFET is activated by a controlled current sink when an over-voltage occurs at the drain of the PFET, and the inherent high impedance of the current sinks relative to the gate discharge amplifier provides high immunity of the PFET to input voltage transients. The result is a practical and effective over-voltage protection circuit for continuously powered electrical loads.

DESCRIPTION OF THE PREFERRED EMBODIMENT

Figure 1:
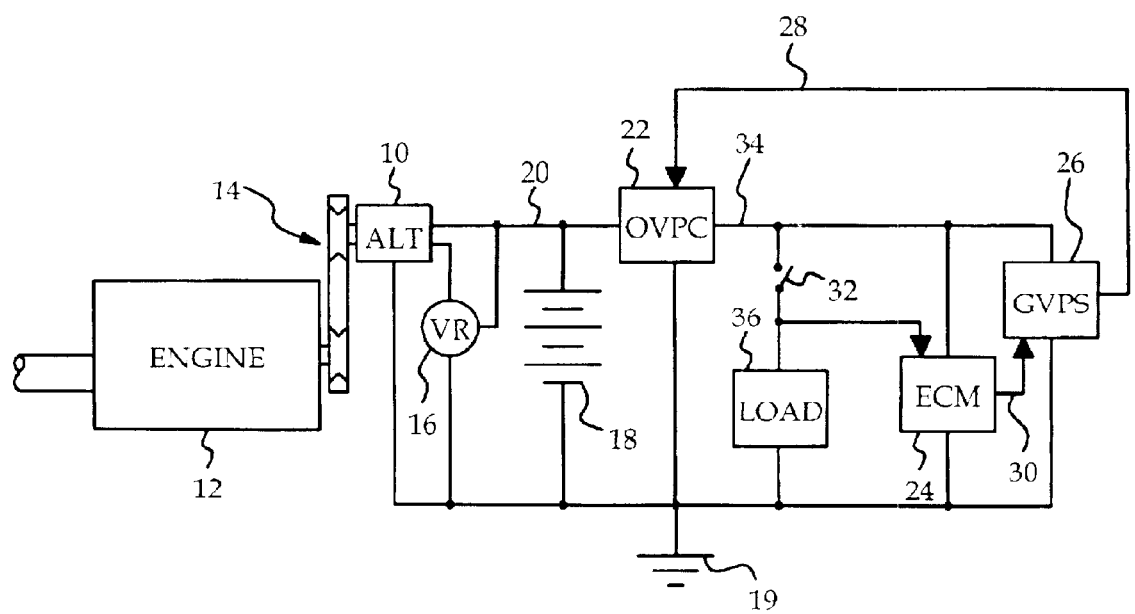
FIG. 1 is a circuit diagram of a motor vehicle electrical system including a series-pass over-voltage protection circuit according to this invention.

Referring to FIG. 1, the over-voltage protection circuit of the present invention is disclosed in the context of a conventional motor vehicle electrical system including a 24V storage battery 18 and one or more continuously powered electrical loads, such as an engine control module (ECM) 24 and a gate voltage power supply (GVPS) 26. However, it will be recognized that the over-voltage protection circuit of this invention can also be used in other applications involving a DC power supply subject to over-voltage transients and one or more continuously powered electrical loads.

In the illustrated electrical system, an engine 12 drives an alternator (ALT) 10 via a belt and pulley arrangement 14, and a voltage regulator 16 controls the alternator field winding excitation during operation of the engine 12 to regulate the voltage on line 20 to a nominal reference voltage such as 27V. The alternator 10 and storage battery 18 are referenced to ground potential 19, and are coupled via line 20 and the over-voltage protection circuit (OVPC) 22 of this invention to various keep-alive electrical loads, including ECM 24 and GVPS 26. As explained below, GVPS 26 develops an elevated gate drive voltage for OVPC 22 on line 28 when activated by ECM 24 via line 30. An ignition switch 32 couples the output of OVPC 22 on line 34 to ECM 24 and various other electrical loads 36.

As mentioned above, voltages significantly in excess of the normal output voltage of alternator 10 can be produced on line 20 during battery-jumping for jump-starting and during alternator load dump events. In heavy-duty environments, typical jump-start voltages may be as high as 80V, particularly in cases where the jump-voltage is obtained from an engine-driven welding generator. Load dump events occur during engine operation when the storage battery 18 becomes disconnected from line 20 due to a loose battery cable or an intermittent internal battery connection, for example. In this case, the alternator output voltage on line 20 can rise well above the nominal reference voltage before voltage regulator 16 can scale back the alternator field winding excitation. If the excessive voltage in either situation were passed on to line 34, the electrical loads 24, 26, 36 could easily be damaged unless they were individually protected from over-voltage (which is typically cost-prohibitive). Thus, the primary function of OVPC 22 is to limit the output voltage on line 34 to a voltage that will not damage the loads 24, 26, 36. Since OVPC 22 achieves this function with a series-pass suppression device connected between input line 20 and output line 34, and since the electrical loads 24, 26 are continuously powered, OVPC 22 must additionally be designed to have low quiescent current draw to prevent discharging of the battery 18 during prolonged periods of vehicle inactivity.

Figure 2:
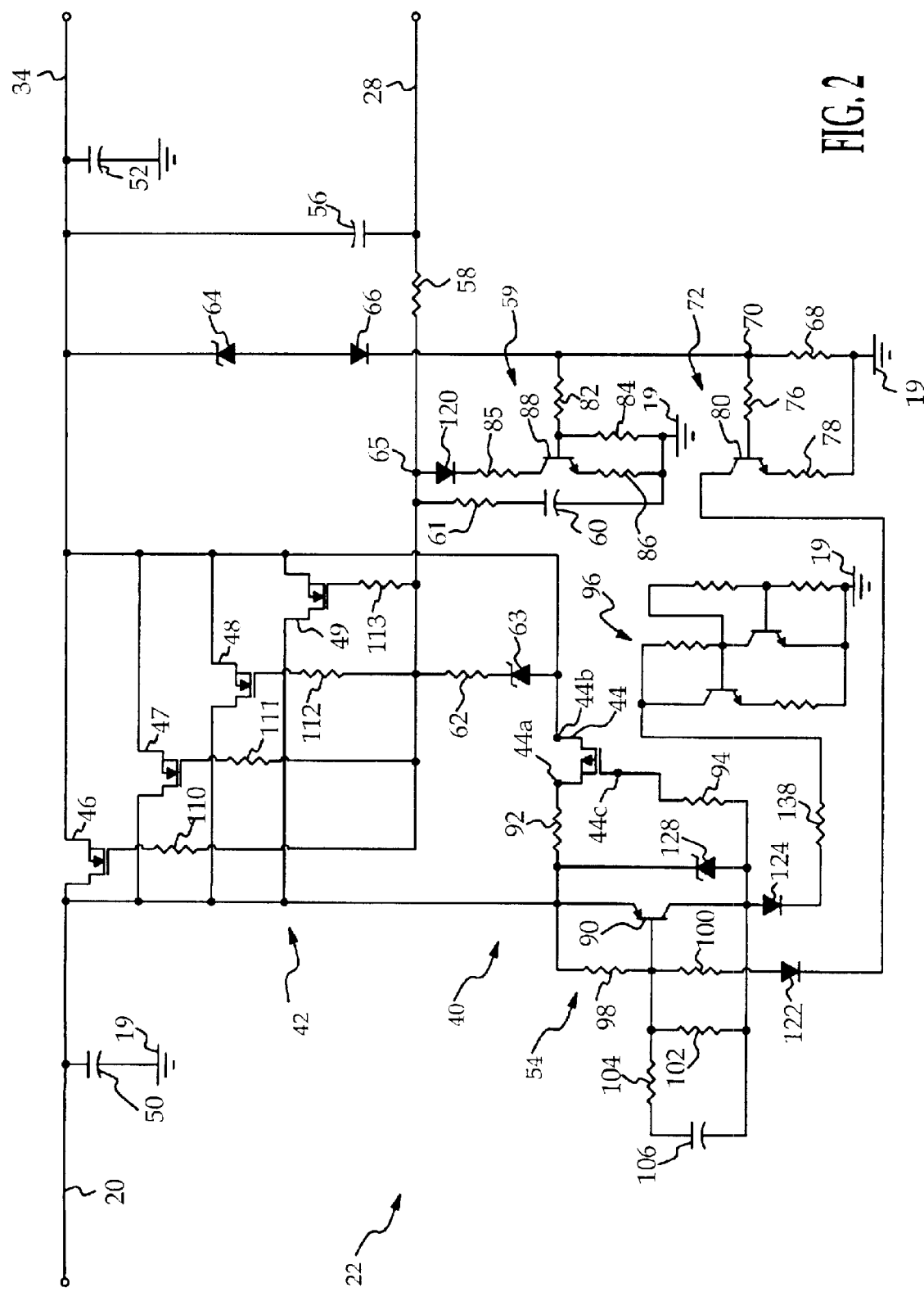
FIG. 2 is a circuit diagram of the series-pass over-voltage protection circuit of FIG. 1.

In general, and referring to FIG. 2, the above-described functionality is carried out with a first power path 40 including a P-channel MOSFET (PFET) 44, a gate discharge amplifier 54 that biases PFET 44 to a fully enhanced mode so long as the operating voltage is below a predetermined threshold, and an over-voltage regulation circuit 72 that reduces the PFET conduction during a detected over-voltage condition. The source 44a of PFET 44 is coupled to input line 20 through a low impedance resistor 92, and the drain 44b is coupled directly to output line 34.

The gate discharge amplifier 54 includes the series combination of resistors 94 and 138, reverse voltage protection diode 124, and constant current sink circuit 96, which couple the gate 44c of PFET 44 to ground potential. The circuit 96 sinks a small and substantially constant current, such as 2 mA, to maintain PFET 44 in the fully enhanced mode during normal operation, and the zener diode 128 prevents the source-to-gate voltage from exceeding a predetermined value such as 13V. Thus, the first power path 40 is characterized under normal operation by its low quiescent current drain, permitting continuous operation of the loads 24, 26 without significantly discharging the battery 18.

The gate discharge amplifier 54 additionally includes a high current capability gate discharge transistor 90 having an emitter coupled to input line 20 and to the source 44a of PFET 44 via resistor 92, which provides source feedback to stabilize the gain of PFET 44 during linear (over-voltage suppression) operation. The collector of transistor 90 is coupled to the junction between resistor 94 and diode 124, and the base of transistor 90 is coupled to the over-voltage regulation circuit 72 via resistor 100 and reverse voltage protection diode 122. The resistor 102 and the series combination of resistor 104 and capacitor 106 are also coupled to the base of transistor 90, and provide voltage feedback and compensation for improved stability during its linear operation, as well as maintaining the gate-to-source impedance of PFET 44 relatively low.

The over-voltage regulation circuit 72 includes a resistor 68 coupled in series with Zener diode 64 and reverse voltage protection diode 66 between output line 34 and ground 19, so that a control voltage is developed at node 70 whenever the output voltage exceeds the breakdown voltage of Zener diode 64 (which may be 30V, for example). The node 70 is connected to the base of transistor 80 via resistor 76, and the emitter-collector circuit of transistor 80 couples the gate discharge amplifier 54 to ground through resistors 100 and 78. Thus, the over-voltage regulation circuit 72 behaves as a current sink that biases transistor 90 of gate discharge amplifier 54 into conduction in relation to the degree to which the output voltage on line 34 exceeds the breakdown voltage of Zener diode 64 (and the forward voltage drop of diode 66). The transistor 90, in turn, operates to discharge the gate-to-source capacitance of PFET 44, driving PFET 44 into its linear operating region to suppress the detected over-voltage.

In the above-described circuit, the impedance of the current sinks 96 and 72 coupling the gate 44c of PFET 44 to ground 19 far exceed the impedance between the gate 44c and source 44a. The gate discharge amplifier 54 maintains low gate-to-source impedance, as mentioned above, although the inherent gate-to-source capacitance of PFET 44 will exhibit even lower impedance at higher frequencies. Thus, when an over-voltage transient occurs on line 20, gate 44c and source 44a both tend to track the input voltage transient until the output voltage transient activates the high current capability gate discharge transistor 90 (via over-voltage regulation circuit 72) to quickly bias PFET 44 into the linear control region for suppressing the detected over-voltage. In other words, input voltage transients do not substantially change the conduction of PFET 44, in contrast to the typical behavior of a series-pass suppression device where input voltage transients actually tend to make the series suppression device even more fully enhanced, resulting in "shoot-through" of the transient over-voltage to output line 34 prior to its suppression.

In the illustrated embodiment, OVPC also includes a second power path 42 that provides a low on-resistance high current connection between input line 20 and the electrical loads 36 during periods of vehicle activity (e.g., when ignition switch 32 is closed). The second power path 42 is implemented with a set of parallel-connected N-channel MOSFETs (NFETs) 46, 47, 48, 49 (or alternatively, a single N-channel MOSFET), with the gate terminals being connected to GVPS output line 28 via respective gate resistors 110, 111, 112, 113 and the resistor 58. Thus, the NFETs 46–49 are activated by the output of GVPS 26 on line 28 whenever ignition switch 32 is closed. The capacitor 56 filters the DC output voltage of GVPS on line 28, and the resistor 58 provides a source impedance that cooperates with an over-voltage regulation circuit 59 to regulate the conduction of NFETs 46–49 during over-voltage conditions, as explained below. The serially connected capacitor 60 and resistor 61 form a compensation network, and zener diode 63 provides gate over-voltage protection for the NFETs 46–49. Resistor 62 limits the current through zener diode 63 and the over-voltage regulation circuit 59 during over-voltage suppression. The over-voltage regulation circuit 59 is coupled to a junction 65 between input resistors 110, 112, 113, 114 and the resistor 58, and regulates the gate voltages of NFETs 46–49 to suppress over-voltages on output line 34. Specifically, the over-voltage regulation circuit 59 includes a transistor 88 that couples the gates of NFETs 46–49 to ground through gate resistors 110–113 and resistors 85 and 86, and the voltage at node 70 is divided by the resistors 82 and 84 and applied to the base of transistor 88. The resistor values are selected such that the over-voltage regulation circuit 59 has a higher voltage regulation set point than the over-voltage regulation circuit 72. Consequently, the over-voltage protection during periods of vehicle activity is actually accomplished by the second power path 42; that is, the over-voltage regulation circuit 72 biases PFET 44 off before the NFETs 46–49 are biased into the linear operating region by the over-voltage regulation circuit 59 to suppress a detected over-voltage.

The OVPC 22 additionally includes input and output filter capacitors 50, 52, and a number of diodes 66, 120, 122, 124 that have only a marginal affect on the operation of the circuit 22, but effectively block reverse voltages in the event that a jump voltage of incorrect polarity is applied across battery 18.

The operation of the power paths 40 and 42 will now be described in the context of both normal and over-voltage conditions. During periods of vehicle inactivity, the transistors 80 and 90 are both non-conductive, and the current sink 96 serves to bias PFET 44 to a fully enhanced state, providing a low quiescent current drain conduction path between battery 18 and keep-alive loads including ECM 24 (and GVPS in the illustrated embodiment). If an over-voltage on line 34 occurs during this condition, the transistors 80 and 90 are biased into conduction to quickly reduce the gate-to-source voltage of PFET 44; this reduces the conduction of PFET 44, thereby regulating the output voltage on line 34 to a value (such as 32V, for example) determined by the over-voltage regulation circuit 72. During periods of vehicle activity (signaled in the illustrated embodiment by closure of ignition switch 32), the PFET 44 remains fully enhanced along with the NFETs 46–49, which provide a high current capability, low on-resistance, path through which alternator 10 and/or battery 18 can supply current to electrical loads 36. If an over-voltage on line 34 occurs during this condition (due to jump-starting or load-dump, for example), the transistors 80 and 88 are biased into conduction to limit the voltage seen by the loads 24, 26, 36 on line 34 to a value (such as 34V, for example) determined by the over-voltage regulation circuit 59. However, since the over-voltage regulation circuit 59 has a higher voltage regulation set point than over-voltage regulation circuit 72, the PFET 44 of the first power path 40 is biased non-conductive before the NFETs 46–49 of the second power path 42, and the output voltage regulation is actually achieved by the NFETs 46–49 of the second power path 42. When the over-voltage condition is terminated, the transistors 80 and 88 return to a non-conductive state, and the PFET 44 and NFETs 46–49 are returned to the fully enhanced state.

In summary, the over-voltage protection apparatus of the present invention provides a practical and effective way of providing quick response over-voltage protection for continuously powered electrical loads. While described in reference to the illustrated embodiment, it is expected that various modifications in addition to those mentioned above will occur to persons skilled in the art. For example, the power path 40 can be used without the power path 42, depending on the application, and so on. Accordingly, it should be understood that series-pass protection circuits incorporating such modifications may fall within the scope of this invention, which is defined by the appended claims.

What is claimed is:

1. A series-pass over-voltage protection circuit for supplying operating voltage to a continuously powered electrical load from a DC voltage supply that is subject to transient over-voltages, comprising:
    a P-channel MOSFET (PFET) having a source coupled to a positive terminal of said voltage supply, a drain coupled to said electrical load, and a gate;
    a first current sink that couples said gate to a negative terminal of said voltage supply and activates said PFET to supply operating voltage to said electrical load;
    a gate discharge amplifier including a high current capability gate discharge transistor coupled between said gate and said source; and
    a second current sink that responds to excessive operating voltage by sinking current from a control terminal of said gate discharge transistor to activate the gate discharge transistor to control the activation of said PFET for suppressing said operating voltage to a value that will not damage said electrical load,
    said first and second current sinks having a characteristic impedance that is relatively high compared to a characteristic impedance of said gate discharge amplifier and PFET so that said gate and source tend to track the transient over-voltages of said voltage supply, and such transient over-voltages do not substantially change the activation of said PFET.

2. The over-voltage protection circuit of claim 1, wherein:
    said first current sink activates said PFET with a constant current for low quiescent current drain; and
    said second current sink only sinks current when said operating voltage exceeds a threshold.

3. A The over-voltage protection circuit of claim 1, wherein said second current sink activates said gate discharge transistor with a controlled current that varies in relation to an amount by which said operating voltage exceeds a threshold.

4. The over-voltage protection circuit of claim 1, wherein said electrical load is part of a motor vehicle electrical system, and the DC voltage supply includes a storage battery and an engine-driven alternator, and is subject to transient over-voltage due to battery jumping and alternator load-dumping.

* * * * *